United States Patent [19]

Vainerman et al.

[11] Patent Number: 5,431,934

[45] Date of Patent: Jul. 11, 1995

[54] DIETARY PRODUCT SIMILAR TO CAVIAR AND METHOD FOR ITS PRODUCTION

[76] Inventors: Efim S. Vainerman, proezd Karamzina, d.9, kv.337, II7436, Moscow, Russian Federation; Tamara I. Bakari, ul.Kosinskaya,d.I8,korp. 3, kv. 32, III538, Moscow,

[21] Appl. No.: 70,416

[22] PCT Filed: Oct. 10, 1991

[86] PCT No.: PCT/SU91/00203

§ 371 Date: Jun. 3, 1993

§ 102(e) Date: Jun. 3, 1993

[87] PCT Pub. No.: WO93/06751

PCT Pub. Date: Apr. 15, 1993

[51] Int. Cl.$^6$ .................... A23L 1/32; A23L 1/328

[52] U.S. Cl. .................... 426/89; 426/104; 426/438; 426/512; 426/515; 426/574; 426/614; 426/802

[58] Field of Search ........... 426/1, 89, 92, 105, 426/138, 140, 574, 273, 277, 278, 614, 422, 438, 442, 512, 815, 805, 802, 104

[56] References Cited

U.S. PATENT DOCUMENTS

| | | | |
|---|---|---|---|
| 3,717,469 | 2/1973 | Slonimsky et al. | 426/658 |
| 3,988,479 | 10/1976 | Stephen et al. | 426/1 |
| 4,202,908 | 5/1980 | Nesmeyanov et al. | 426/89 |
| 4,362,748 | 12/1982 | Cox | 426/89 |
| 4,375,481 | 3/1983 | Kuwabara et al. | 426/93 |

FOREIGN PATENT DOCUMENTS

| | | | |
|---|---|---|---|
| 2564292 | 5/1984 | France. | |
| 3432369 | 5/1985 | Germany. | |
| 1423098 | 9/1988 | Russian Federation. | |
| 682183985 | 6/1987 | United Kingdom | 426/98 |
| 218652 | 6/1973 | U.S.S.R. . | |

*Primary Examiner*—Anthony J. Weier
*Attorney, Agent, or Firm*—Collard & Roe

[57] ABSTRACT

A dietary product includes granules having an outer layer of a viscous aggregate-stable emulsion, with the following ratio of components forming the granules, % by mass:

| | |
|---|---|
| egg white | 13–30 |
| egg yolk | 45–71 |
| oil material | 9.0–30 |
| food colorant | 1.0–3.0. | heating of the egg white to a temperature not below 35° C., introducing egg yolk, oil material and fool colorant in the indicated ratios until formation of a viscous emulsion which is fed dropwise into food vegetable oil heated to a temperature of 80°–95° C.

9 Claims, No Drawings

DIETARY PRODUCT SIMILAR TO CAVIAR AND METHOD FOR ITS PRODUCTION

This application is filed under 35 U.S.C. 371 with respect to PCT Application SU91/00203, filed Oct. 10, 1991.

TECHNICAL FILED

The present invention relates to dietary product similar to caviar and more particularly to caviar of sturgeon fish and to a method for its production.

PRIOR ART

Natural catch of such valuable delicious dietary product as caviar of sturgeon and cartilaginous fish is reduced owing to worsening of ecological situation and decreased number of habitats of these kinds of fish. That is why, at present widely used are various methods for production of dietary products analogous to natural caviar of sturgeon and cartilaginous fish.

Known art methods for production of dietary products analogous to caviar differ in quality of the used protein raw material, gelation component, parameters of technological process, and make it possible to produce said products in the form of granules or capsules.

Known in the art is a method for production of dietary products similar to caviar (GB,B,2,183,985) providing production of capsules consisting of layers of calcium alginate filled with viscous liquid and oil material in the form of two phases. The method resides in preparing an emulsion consisting of a viscous liquid, oil material and calcium salt; forming of capsules by way of dropwise adding said emulsion to an aqeous solution of calcium alginate and surrounding of said drop-like emulsion by a layer of calcium alginate; separating said emulsion in the capsules into viscous liquid and oil material by way of heating the capsules at a temperature more than 45° C. Viscous liquid includes an aqeous solution of a sol material selected from the group: xanthene gum, evergreen bean tree fruits' gum, guar gum, gelatin and carragenin. As oil material used are animal and/or vegetable oils selected from the group consisting of soy-bean oil, rape oil, fish oil and lard oil.

The obtained dietary product approaches at maximum roe of cartilaginous fish in texture, form-stability properties, content of water retained in a capsule for a long time.

However, this dietary product has rather large size of a capsule, up to 8 mm in diameter, and higher strength of a capsule due to the presence of calcium gluconate as compared with genuine roe of cartilaginous fish. This method is characterized by a multi-stage outline and difficulty in controlling the quality of the obtained product at intermediate stages.

Known in the art is a method for production of a dietary product similar to caviar of sturgeon fish species (SU,1,423,098) consisting in preparing a mixture of albumin milk, gelatin, flavour additives and black food colourant in the form of a viscous liquid at a temperature of 95° C., feeding this liquid in a dropwise manner into food vegetable oil at heating the latter to a temperature of 110°–150° C. and forming gelatinous grains during 7–20 s. The obtained grains are immersed into a low layer of vegetable oil cooled to a temperature of 15° C. for solidification. Solidified grains are subjected to culinary treatment with a mixture of ascorbic acid, fish oil, corn oil and common salt.

The dietary product produced by this method has a strong capsule formed by gelatin and is characterized by insufficient organoleptic properties due to a low content of oil (1.2–2.5%) in albumin milk, pure transparence of a grain. Such dietary product would not possess mild delicate consistence, required colour, that is it would not correspond in its quality to the genuine caviar of sturgeon fish species.

The method is characterized by considerable power expenditures and doesn't make it possible to control the quality of the product obtained due to high temperatures of conducting the process.

DISCLOSURE OF THE INVENTION

The invention is based on the problem to provide a dietary product similar to caviar, approaching at maximum, in its properties, the genuine caviar of sturgeon fish, and to provide a method for its production by way of respective selection of components, changing conditions of preparing their mixture and forming the dietary product, which would make it possible to improve the end product quality due to enhanced organoleptic properties at considerable simplification of the technological process.

This problem is solved by offering a dietary product similar to caviar comprising granules having an outer layer of denaturated egg white and an inner layer consisting of an aggregate-stable emulsion formed by non-denaturated egg white, egg yolk, oil material and food colourant, with the following ratio of components forming a granule, % by mass:

| | |
|---|---|
| egg white | 13–30 |
| egg yolk | 45–71 |
| oil material | 9.0–30 |
| food colourant | 1.0–3.0. |

The dietary product of the invention, owing to introduction of egg white and yolk, oil material into its composition, approaches at maximum the genuine caviar of sturgeon fish species in relation of quantitative content of valuable proteins, oil, vitamins and microelements. It is characterized by an excellent form-stability, has a light grain 2.5–3. mm in diameter and of a required colour, mild delicate consistence in taste, that is it is an analogue of caviar of sturgeon fish species in its organoleptic properties. Pasteurized and canned dietary product of the invention can be kept for a long time. For example, after 6 months' storage in a refrigerator, it preserves its wonderful taste.

It is reasonable that said oil material should comprise at least one animal and/or vegetable oil selected from the group consisting of olive oil, soy-bean oil, sunflower oil, corn oil, fish oil, margarine and butter.

Such oil material ensures viscosity of the emulsion forming the inner layer of the granule which is very close to viscosity of the genuine grain of roe, and doesn't affect organoleptic properties of the dietary product. It is also desirable that said oil material should contain oil-soluble flavour additive taken in the amount of 2–10% of the total mass of said components forming a granule. To improve taste of the dietary product and ensure aggregate stability of the emulsion forming the inner layer of a granule, it is advantageous that the oil material should comprise common salt in the amount of 3–10% of the total mass of said components forming a granule.

The problem is also solved by providing a method for production of a dietry product similar to caviar, including preparation of a mixture of components in the form of a viscous liquid, dropwise introduction of this liquid into food vegetable oil at heating of the latter, in which, according to the invention, as components of the mixture use is made of egg white, egg yolk, oil material and food colourant, and their mixture is prepared by way of heating the egg white, taken in the amount of 13–30% by mass, to a temperature not below 35° C., and introduction therein of egg yolk, oil material and food colourant, taken in a mass ratio of 45–74:9.0–30:1.0–3.0, respectively, till formation of an aggregate-stable emulsion in the form of a viscous liquid, the obtained emulsion is dropwise fed into the food vegetable oil, a temperature of which is maintained in 80°–95° C. range, and granules of the end product are formed.

Conducting the process under such temperature conditions and using the components of such qualitative and quantitative composition makes it possible to produce a dietary product in the form of granules, similar in structure to grains of the genuine caviar of sturgeon fish species. As distinct from capsules, the granules may be conceived as a single whole, that is they are formed by an aggregate-stable emulsion with a viscous consistence, the structure of which becomes dense and strong in the peripheral part of the granule due to denaturation of the egg white. It is precisely the gel-like structure from the egg white in the surface layer of the emulsion drop that determines presence of two layers of the composition indicated above. The granules are formed owing to the forces of surface tension as a drop of viscous emulsion formed by the mixture of components gets into the heated food vegetable oil.

Composition of components is determined by the necessity to produce a viscous aggregate-stable emulsion. Using the egg white in the amount less than 13% by mass leads to worsening of form-stability of a granule and to deterioration of taste of the dietary product. Increase of its content in the dietary product more than 30% by mass results in the fact that the granule becomes denser, mildness and delicacy of its taste vanish, a whitish tint appears, that is commercial appearance worsens.

Decrease of the egg yolk content below 45% by mass results in deterioration of calorie content of the dietary product, while its increase above 17% by mass leads to reduced form-stability of the granule and deterioration of taste of the product.

Oil material in the capacity of which it is expedient to use at least one animal and/or vegetable oil selected from the group consisting of olive oil, soy-bean oil, sunflower oil, corn oil, fish oil, margarine, butter, imparts the necessary full value of oil to the dietary product, provides the product with delicious consistence, makes it possible for the mixture of components to be in the form of an aggregate-stable emulsion. That is why, decrease of its content below 9.0% by mass considerably affects organoleptic properties of the dietary product, while its increase more than 30% by mass results in stratification of the emulsion forming the inner layer of the granule.

Food colourant is used in the amount of 1.0–3.0% by mass depending on the required colour intensity of the dietary product as compared with the caviar of white sturgeon, stellate sturgeon and sturgeon.

In preparing an aggregate-stable emulsion with a viscous consistence from the mixture of components, egg white is preliminarily heated to a temperature not below 35° C., preferably in 35°–45° C. range, and then egg yolk, oil material and food colourant are introduced therein at the indicated mass ratio. At a specified temperature, egg white has not enough time to start denaturation and optimal conditions are created for distribution of the components within the total mass of the mixture, for homogenation of the latter, provides is subsequent faster granulation of the mixture drops in the heated food vegetable oil.

To dispense with subsequent culinary treatment of the obtained dietary product, it is reasonable to introduce oil-soluble flavour additives in the amount of 2–10% and common salt in the amount of 3–10% of the total mass of the components forming a granule. As a flavour additive, use may be made of herring milt, milt of cartilaginous fish, spiced sprats. Oil material is thoroughly mixed with flavour additive and common salt, preferably till formation of a uniform homogeneous mass, which is then passed through a sieve and added to a heated egg white. It should be noted that stirring of the components may be effected while preparing a mixture therefrom or during a process of their introduction into the egg white or after this introduction. As the mixture is prepared during a time excluding its cooling below 35° C., a process of granulation of drops in the form of a viscous emulsion in the vegetable oil heated to a temperature of 80°–95° C. is so fast that only a part of egg white has enough time to get denaturated and emulsion preserves its properties now in the granule. At a temperature below 80° C., form-stability of the granule is considerably lost, the granule can be easily destroyed, while at a temperature above 95° C. the granule becomes rigid, the colourant becomes colourless, organoleptic properties of the dietary product worsen. Drops of the mixture of components are fed with the aid of a metal capillary through the "heated vegetable oil—air" boundary surface. Feeding rate through a capillary is selected taking into account viscosity of the mixture of components which is determined by their mass ratio so as to prevent destruction of drops at striking the surface. It is reasonable that vegetable oil should circulate in a vessel where granulation is performed and be diluted with new portions as the oil has a tendency to become rancid and taste of the obtained dietary product worsens. By a flow of vegetable oil the granules are delivered from the vessel onto a sieve to be separated from the oil. In a necessary case, the obtained dietary product is subjected to culinary treatment. To do this, the dietary product of the invention is mixed with a homogenate from liver of wall-eye pollack, milt of cartilaginous fish and fish oil, or homogenate of cod in its juice. The obtained dietary product approaches at maximum the genuine caviar of sturgeon fish species in its properties. The method, according to the invention, characterized by a simple technology, includes only two stages. It doesn't require considerable power expenditures and complicated equipment. Quality of the obtained dietary product is easily controlled at any of these stages.

Best Embodiment of the Invention

In a vessel equipped with a stirrer added are 210 g egg white heated to a temperature of 40° C., then 650 g egg yolk and 10 g black food colourant are introduced thereto. Preliminarily prepared is a mixture consisting of 65 g of deodorized sunflower oil, 65 g of cod oil, 20 g of herring milt and 30 g of common salt, the mixture is thoroughly ground till formation of a homogeneous mass. The homogeneous mass is passed through a sieve and introduced into the mixture of components under stirring till formation of a viscous aggregate-stable emulsion. Through a metal capillary 2.0 mm in diameter, the obtained emulsion is fed dropwise into a column containing circulating corn oil heated to a temperature of 89° C. Feeding rate is 150 drops per minute.

Formed spherical granules 2.5 mm in diameter are carried out by oil onto a sieve for letting the oil drain off.

The obtained dietary product similar to caviar of stellate sturgeon contains granules having an outer layer of denaturated egg white and an inner layer of a viscous aggregate-stable emulsion formed by the components indicated below and taken in the following ratio, % by mass:

| | |
|---|---|
| egg white | 21 |
| egg yolk | 65 |
| black food colourant | 1.0 |
| oil material | 13 |
| oil-soluble flavour additive taken in the amount of 2% by mass common salt taken in the amount of 3% by mass. | |

Said additive and common salt are dissolved in the oil material and their amount is calculated for a whole mass of egg white, egg yolk, oil material and black food colourant. The obtained dietary product, in its appearance and taste, is analogous to caviar of stellate sturgeon.

Given below are another examples of realization of the invention.

EXAMPLE 1

In a vessel equipped with a stirrer, fed were 130 g egg white heated to a temperature of 38° C., then 710 g egg yolk and 30 g black food colourant were introduced therein under stirring. Preliminarily prepared was a mixture consisting of 80 g of soy-bean oil, 50 g of margarine and 100 g of spiced sprats, the mixture was thoroughly ground till formation of a homogeneous mass. The homogeneous mass was passed through a sieve and introduced into the mixture of components under stirring till formation of a viscous aggregate-stable emulsion. Using a metal capillary 2.5 nun in diameter, the obtained emulsion was dropwise fed into a column with circulating corn oil heated to a temperature of 90° C. Feeding rate was 150 drops per minute. Formed granules 3 mm in diameter were carried out by oil onto a sieve for letting the oil drain off.

The obtained dietary product similar to caviar of sturgeon fish contained granules having an outer layer of denaturated egg white and an inner layer of a viscous emulsion formed by the components indicated below and taken in the following ratio, % by mass:

| | |
|---|---|
| egg white | 13 |
| egg yolk | 71 |
| black food colourant | 3.0 |
| oil material | 13 |
| oil-soluble flavour additive taken in the amount of 10% by mass of the total mass of egg white, egg yolk, oil material and black food colourant. | |

The obtained dietary product, in its appearance and taste, was analogous to caviar of sturgeon fish.

EXAMPLE 2

In a vessel equipped with a stirrer, fed were 300 g egg white heated to a temperature of 45° C., then 600 g egg yolk and 10 g black food colourant were introduced therein under stirring. Preliminarily prepared was a mixture consisting of 45 g of butter, 45 g of oil of cartilaginous fish and 100 g of common salt, the mixture was thoroughly ground till complete dissolving of the salt. Said oil material containing salt dissolved therein was introduced into the mixture of components under stirring till formation of a viscous aggregate-stable emulsion. Using a metal capillary 2.5 mm in diameter, the obtained emulsion was introduced dropwise into a column with circulating soy-bean oil heated to a temperature of 95° C. Feeding rate was 130 drops per minute. Formed spherical granules 3 mm in diameter were carried out by oil onto a sieve for letting the oil drain off, then the granules were subjected to culinary treatment. A homogenate from 50 g of cod liver in its juice was prepared and mixed with the granules.

The obtained dietary product similar to caviar of stellate sturgeon contained granules having an outer layer of denaturated egg white and an inner layer of a viscous emulsion formed by the components indicated below and taken in the following ratio, % by mass:

| | |
|---|---|
| egg white | 30 |
| egg yolk | 60 |
| black food colourant | 1.0 |
| oil material | 9.0 |
| common salt taken in the amount of 10% of the total mass of egg white, egg yolk, oil material and black food colourant. | |

The obtained dietary product, in its appearance and taste, was analogous to caviar of stellate sturgeon.

EXAMPLE 3

In a vessel equipped with a stirrer, fed were 250 g egg white heated to a temperature of 35° C., then 450 g egg yolk and 10 g black food colourant were introduced therein. Preliminarily prepared was a mixture consisting of 300 g of anchovy fish oil, and 60 g of herring milt, the mixture was ground till formation of a homogeneous mass. The homogeneous mass was passed through a sieve and mixed with the components indicated above till formation of a viscous aggregate-stable emulsion. Using a metal capillary 2.5 mm in diameter, the obtained emulsion was dropwise fed into a column with circulating corn oil heated to a temperature of 87° C. Feeding rate was 140 drops per minute. Formed spherical granules 3 mm in diameter were carried out by oil onto a sieve for letting the oil drain off.

The obtained dietary product similar to caviar of stellate sturgeon, contained granules having an outer layer of denaturated egg white and an inner layer of a viscous emulsion formed by the components indicated below and taken in the following ratio, % by mass:

| | |
|---|---|
| egg white | 25 |
| egg yolk | 45 |
| black food colourant | 1.0 |
| oil material | 30 |
| oil-soluble flavour additive taken in the amount of 6% of the total mass of egg white, egg yolk, oil material and black food | |

-continued colourant.

The obtained dietary product, in its appearance and taste, was analogous to caviar of stellate sturgeon.

EXAMPLE 4

200 g of egg white heated to a temperature of 35° C. were fed into a vessel equipped with a stirrer. Into the vessel filled with egg white introduced were 600 g of egg yolk, 180 g of anchovy fish oil and 20 g of black food colourant, the components were mixed till formation of a viscous aggregate-stable emulsion. Using a metal capillary 2.5 mm in diameter, the obtained emulsion was dropwise introduced into a column with circulating olive oil, a temperature of which was maintained equal to 80° C., the column having an air space in its top part. Feeding rate was 150 drops per minute. Formed spherical granules 3 mm in diameter were carried out by oil onto a sieve for letting the oil drain off, after that the granules were subjected to culinary treatment. A homogenate from 20 g of wall-eye pollack liver, 20 g of milt of cartilaginous fish and 10 g of fish oil was prepared, which was then mixed with the granules.

The obtained dietary product, similar to caviar of stellate sturgeon, contained granules all an amber-black colour, having an outer layer of denaturated egg white and an inner layer of a viscous emulsion formed by the components indicated below and taken in the following ratio, % by mass:

| | |
|---|---|
| egg white | 20 |
| egg yolk | 60 |
| anchovy fish oil | 18 |
| black food colourant | 2.0 |

The obtained dietary product, in its appearance and taste, was analogous to caviar of stellate sturgeon.

Industrial Applicability

The proposed invention will find application in food industry for production of a delicious dietary product of high quality, which is analogous to the genuine caviar of sturgeon fish species.

We claim:

1. A method for the production of a dietary granule product comprising
preparing a mixture consisting of egg white, egg yolk, oil material, and food colorant wherein said mixture is prepared by heating egg white in an amount of 13–30% by mass based upon the total mass to a temperature not below 35° C., and introducing therein egg yolk, oil material and food colorant, in a mass ratio of 45–71:9.0–30:1.0–3.0, based the total mass, respectively, until formation of a viscous aggregate-stable emulsion;
feeding said viscous emulsion dropwise into vegetable oil, at a temperature which is maintained within 80°–95° C., range, and
forming granules of the dietary product.

2. A method according to claim 1,
wherein the egg white is heated to a temperature within the range of 35°–45° C.

3. A method according to claim 1,
wherein the oil material used comprises at least one animal oil or vegetable oil selected from the group consisting of olive oil, soy-bean oil, sunflower oil, corn oil, fish oil, margarine and butter.

4. A method for the production of dietary granule product comprising preparing a mixture consisting of egg white, egg yolk, oil material, food colorant, and an oil-soluble flavor additive wherein said mixture is prepared by heating egg white in an amount of 13–30% by mass based upon the total mass to a temperature not below 35° C., and introducing therein said egg yolk, oil material and food colorant, in a mass ratio of 45–71:9-.0–30:1.0–3.0. based on the total mass, respectively, and said oil soluble flavor additive, until formation of a viscous aggregate-stable emulsion wherein prior to introduction of said oil material into egg white, said oil soluble flavor additive is added to said oil material in an amount of 2–10% of said total mass; feeding said viscous emulsion dropwise into vegetable oil at a temperature which is maintained within 80°–95° C.; and forming granules of the dietary product.

5. A method for the production of a dietary granule product comprising preparing a mixture consisting of egg white, egg yolk, oil material, food colorant and salt wherein said mixture is prepared by heating egg white in an amount of 13–30% by mass based upon the total mass to a temperature not below 35° C., and introducing therein said egg yolk, oil material and food colorant, in a mass ratio of 45–71:9.0–30:1.0–3.0, based on the total mass, respectively, and said salt until formation of a viscous aggregate-stable emulsion wherein prior to introduction of said salt into egg white, said salt is added to said oil material in an amount of 3–10% of the total mass; feeding said viscous emulsion dropwise into vegetable oil, at a temperature which is maintained within 80°–95° C. range; and forming granules of the dietary product.

6. A dietary granular product made by the method of claim 1.

7. A dietary granular product made by the method of claim 3.

8. A dietary granular product made by the method of claim 4.

9. A dietary granular product made by the method of claim 5.

* * * * *